US009441746B2

(12) United States Patent
Borlon et al.

(10) Patent No.: US 9,441,746 B2
(45) Date of Patent: Sep. 13, 2016

(54) PISTON-CONTROLLED ANTI-SIPHON VALVE

(71) Applicant: Techspace Aero S.A., Herstal (Milmort) (BE)

(72) Inventors: Thomas Borlon, Wandre (BE); Albert Cornet, Verviers (BE)

(73) Assignee: Techspace Aero S.A. (BE)

( * ) Notice: Subject to any disclaimer, the term of this patent is extended or adjusted under 35 U.S.C. 154(b) by 134 days.

(21) Appl. No.: 14/314,497

(22) Filed: Jun. 25, 2014

(65) Prior Publication Data

US 2014/0373939 A1    Dec. 25, 2014

(30) Foreign Application Priority Data

Jun. 25, 2013   (EP) ..................................... 13173555

(51) Int. Cl.
| | | |
|---|---|---|
| *F16K 15/18* | (2006.01) | |
| *F01D 25/18* | (2006.01) | |
| *F01M 1/16* | (2006.01) | |
| *F01M 11/06* | (2006.01) | |
| *F16N 19/00* | (2006.01) | |
| *F01M 11/00* | (2006.01) | |

(52) U.S. Cl.
CPC ............... *F16K 15/18* (2013.01); *F01D 25/18* (2013.01); *F01M 1/16* (2013.01); *F01M 11/06* (2013.01); *F16N 19/006* (2013.01); *F01M 2011/007* (2013.01); *Y10T 137/3149* (2015.04)

(58) Field of Classification Search
CPC ......... F16K 15/18; F01D 25/18; F01M 1/16; F01M 11/06; F01M 2011/007; F16N 19/006
See application file for complete search history.

(56) References Cited

U.S. PATENT DOCUMENTS

| 3,723,025 | A | * | 3/1973 | Coakley | ................. | F04C 14/26 |
| | | | | | | 137/115.13 |
| 3,965,922 | A | * | 6/1976 | McCornack | ............ | F16K 21/10 |
| | | | | | | 137/218 |
| 4,389,984 | A | * | 6/1983 | Destrampe | .............. | F01D 25/18 |
| | | | | | | 123/196 S |

(Continued)

FOREIGN PATENT DOCUMENTS

| DE | 3638958 A1 | 5/1988 |
| DE | 19838927 A1 | 3/2000 |

(Continued)

OTHER PUBLICATIONS

European Search Report dated Aug. 14, 2013 for EP 13173555.7.

*Primary Examiner* — Craig Schneider
*Assistant Examiner* — Kevin Barss
(74) *Attorney, Agent, or Firm* — James E. Walton; Brian E. Harris

(57) ABSTRACT

The present application relates to an anti-siphon valve for a tank including a body with an inlet, an outlet, and a passage for the fluid, the passage connecting the inlet to the outlet. The anti-siphon valve further includes a movable cut-off device interacting with a seat to close the passage. The cut-off device normally remains in the closed position and is designed to open the passage in the presence of a positive pressure difference between the inlet and the outlet. The anti-siphon valve further includes an auxiliary control mechanism for the cut-off device towards the passage opening, the control mechanism being designed to act on the cut-off device only to open the passage, so as to enable the cut-off device to move under the effect of pressure at the outlet independently of the mechanism.

20 Claims, 3 Drawing Sheets

(56) References Cited

U.S. PATENT DOCUMENTS

| | | | | |
|---|---|---|---|---|
| 4,412,789 A * | 11/1983 | Ohe | ............ | F04C 14/02 417/288 |
| 4,717,000 A * | 1/1988 | Waddington | ............ | F01D 25/18 184/108 |
| 4,796,652 A * | 1/1989 | Hafla | ............ | B23B 31/302 137/116.3 |
| 5,018,601 A * | 5/1991 | Waddington | ............ | F01D 25/18 184/6.11 |
| 5,125,429 A * | 6/1992 | Ackroyd | ............ | E03C 1/104 137/218 |
| 5,590,675 A * | 1/1997 | Babb | ............ | B67D 7/36 137/14 |
| 6,161,515 A * | 12/2000 | Kopec | ............ | F01M 1/16 123/196 CP |
| 2013/0081720 A1 * | 4/2013 | Schmidt | ............ | F01M 1/16 137/565.11 |
| 2014/0331639 A1 * | 11/2014 | Raimarckers | ............ | F01C 21/045 60/39.08 |

FOREIGN PATENT DOCUMENTS

| | | |
|---|---|---|
| DE | 10206268 A1 | 8/2003 |
| FR | 2654466 A1 | 5/1991 |

* cited by examiner

PISTON-CONTROLLED ANTI-SIPHON VALVE

This application claims priority under 35 U.S.C. §119 to European Patent Application No. 13173555.7, filed 25 Jun. 2013, titled "Piston-Controlled Anti-Siphon Valve," which is incorporated herein by reference for all purposes.

BACKGROUND

1. Field of the Application

The present application relates to the field of fluid flow in pipes, in particular to the field of anti-siphon valves. More particularly, the present application relates to the field of lubrication of a turbomachine. More particularly, the present application relates to an anti-siphon valve for sucking up a liquid from a tank, in particular an oil tank in the supply circuit of a turbomachine.

2. Description of Related Art

A turbomachine uses oil for different functions. This oil is used primarily to lubricate moving parts, but it can also be used for actuating devices through its pressure. For example, it can be used to adjust the pitch of the fan blades of a turboprop, or to damp movement transferred by the bearings. The oil may also be used to heat or cool certain parts of the turboprop and even the aircraft itself.

To perform these functions, the oil is fed into a supply circuit having a plurality of pumps ensuring its circulation. The circuit generally comprises an oil tank for storing oil, its volume being able to satisfy the engine's oil consumption over a given time, whilst maintaining a safety reserve.

To prevent the tank from emptying by gravity when the turbomachine has stopped, an anti-siphon valve may be located at its output. This anti-siphon valve may be opened by the effect of suction created by a downstream pump. So that the valve opens more reliably, its opening may be assisted by an auxiliary mechanism. This latter is operated by oil discharged by a pump located downstream of the valve.

Published patent FR2654466 A1 discloses a tank of an oil supply circuit of a turbomachine. The tank is fitted with an anti-siphon valve located at the lowest point of the tank. The valve is designed to prevent the oil in the tank being emptied by gravity. The opening of the valve is controlled by an annular chamber surrounding the valve, the chamber being actuated by oil discharged from a pump fitted to the turbomachine's oil supply system.

However, an aircraft turbine engine may be exposed to extreme temperatures, of the order of −40° C. to −50° C. In these circumstances, the oil may solidify in the tank, the valve, the auxiliary mechanism and the control piping.

This solidified oil then risks clogging the piston and slowing its opening. This delay in opening prevents the oil from flowing and creates pressure losses within the valve. It is then necessary to wait some time for the turbomachine to warm up and for its oil once again to become sufficiently fluid to allow actuation of the auxiliary mechanism and the valve to fully open. This warming-up period limits the use of an aircraft turbomachine as stringent safety rules are rigorous in this area. The warming-up period causes operational downtime because of non-use of the turbomachine and/or the corresponding aircraft.

Although great strides have been made in the area of anti-siphon valve, many shortcomings remain.

DETAILED DESCRIPTION OF THE PREFERRED EMBODIMENT

Figure 1:
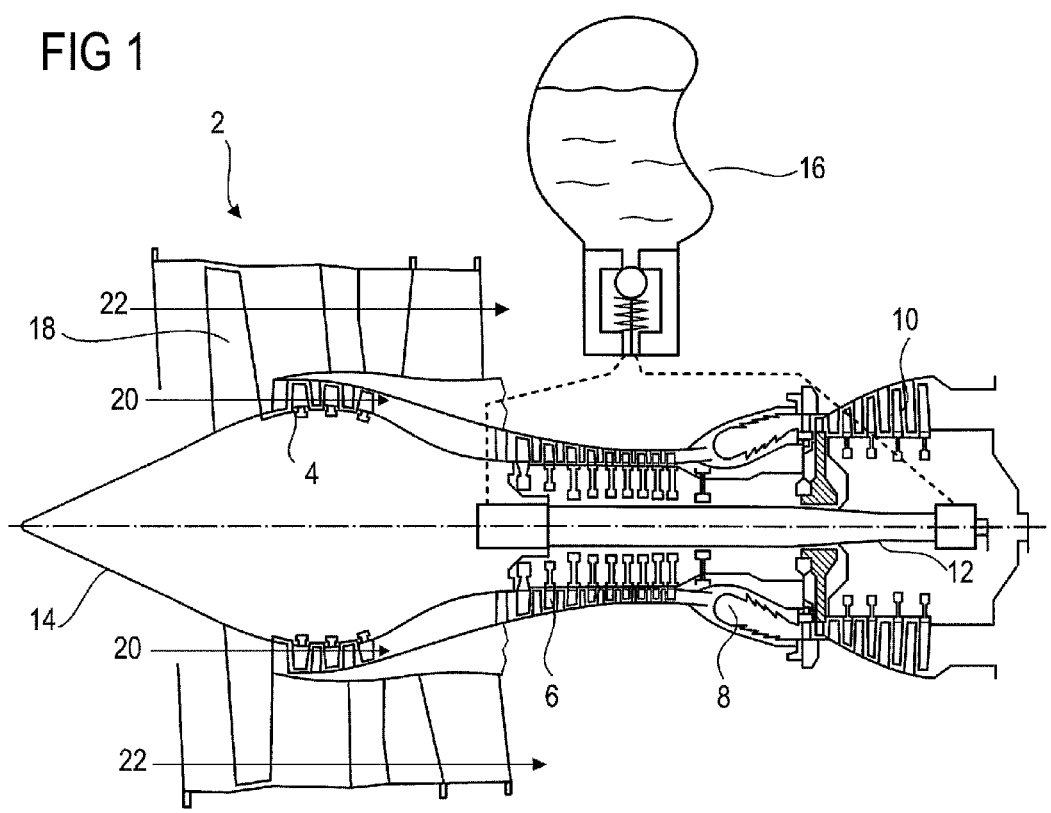
FIG. 1 shows an aircraft turbomachine in accordance with the present application.

The present application aims to solve at least one of the technical shortcomings of the prior art. More specifically, the present application aims to reduce the pressure loss, even the obstruction, in a fluid tank fitted with an anti-siphon valve when the fluid is made viscous by low temperatures.

The present application relates to an anti-siphon valve for a fluid tank, in particular for an oil tank, comprising: a body having an inlet, an outlet and a fluid passage, the passage connecting the inlet to the outlet; a movable cut-off device mating with a seat so as to close the passage, the device normally being in the closed position and designed to open the passage in the presence of a pressure difference between the inlet and the outlet which is greater than some positive value; an auxiliary control mechanism to the cut-off device towards the open position of the passage, wherein the auxiliary control mechanism to the cut-off device is designed to act on the cut-off device only in the opening direction of the passage, thereby permitting the said cut-off device to move in the opening direction under the effect of the pressure at the outlet independently of the said mechanism.

According to an advantageous embodiment of the present application, the auxiliary control mechanism is actuated by a fluid, preferably a liquid.

According to an advantageous embodiment of the present application, the auxiliary control mechanism comprises a piston mechanically connected to the cut-off device by an end-stop system when the piston moves in the direction corresponding to opening the passage.

According to an advantageous embodiment of the present application, the end-stop system comprises a rod sliding through the piston and comprising an end-stop with which the piston makes contact as it moves in the direction corresponding to opening the passage, the rod preferably being integral with the cut-off device.

According to an advantageous embodiment of the present application, the anti-siphon valve comprises a chamber in which the piston is a sliding fit.

According to an advantageous embodiment of the present application, the passage comprises an inner surface that matches the periphery of the cut-off device during its movement between the closed position and the open position, the periphery of the cut-off device preferably sweeping across the output during its movement between the closed position and the open position.

According to an advantageous embodiment of the present application, the anti-siphon valve comprises a spring designed to keep the cut-off device in the closed position, the spring preferably being located between the cut-off device and the auxiliary control mechanism.

According to an advantageous embodiment of the present application, the spring is preloaded so that the limiting value of the pressure difference that opens the passage is greater than 0.05 bar, preferably 0.10 bar, more preferably 0.50 bar, even more preferably 2 bar.

According to an advantageous embodiment of the present application, the anti-siphon valve comprises an annular groove which is open axially towards the auxiliary control mechanism, the auxiliary control mechanism preferably being designed to close the annular groove.

The present application also relates to a tank for fluid, especially oil, comprising at least one opening and an anti-siphon valve for closing the, or an, opening wherein the anti-siphon valve complies with the present application.

According to an advantageous embodiment of the present application, the anti-siphon valve comprises a chamber in which is located the auxiliary control mechanism, the said chamber opening into the tank.

According to an advantageous embodiment of the present application, the anti-siphon valve comprises an actuator pipe in communication with the outside of the tank and the auxiliary control mechanism.

According to an advantageous embodiment of the present application, the tank includes a heat exchanger designed to exchange heat between air and a liquid.

According to an advantageous embodiment of the present application, the tank comprises a casing, the anti-siphon valve being located inside the casing, the body of the anti-siphon valve preferably being in contact with the casing or the body of the anti-siphon valve preferably being remote from the casing if the anti-siphon valve is located outside the casing.

The present application also relates to a turbomachine, particularly one in an aircraft, comprising a tank and/or an anti-siphon valve, wherein the anti-siphon valve is in accordance with the present application and/or the tank is in accordance with the present application.

The present application also relates to an oil supply circuit comprising an oil tank wherein the oil tank is in accordance with the present application.

The present application allows the cut-off device to open itself under negative pressure independently of the auxiliary control mechanism. This is especially the case when the fluid is viscous and thus rendered sticky, particularly when it is at a low temperature.

The present application provides a compact valve even though it has different operating states.

FIG. 1 shows an axial turbomachine. In this case it is double-flow turbojet 2 which is intended to be fitted on a vehicle such as an aircraft. The turbomachine 2 may also be a turboprop.

The turbomachine 2 comprises a first compressor called a low-pressure compressor 4, and a second compressor called a high-pressure compressor 6. The turbomachine 2 may include a combustion chamber 8 and a turbine 10, possibly several turbines. In operation, the mechanical power from the turbine 10 is transmitted via the central shaft 12 to the rotor 14. The shaft then sets at least one of the two compressors 4 and 6 in motion. Gearing may increase or decrease the speed of rotation transmitted to the compressors. Alternatively, the different turbines may each be connected to the compressors via concentric central shafts.

The central shaft 12 is rotatably mounted with respect to the housing of the turbomachine 2 by means of bearings. These may include mechanical bearings that must be lubricated. This requirement is also necessary for the gearboxes. To satisfy these needs, the turbojet 2 includes an oil feed system that delivers oil to the different sets of bearings and the gearboxes.

The supply system may include an oil supply circuit. This may comprise a heat exchanger to cool the oil during operation. A volume of oil is stored in a tank 16. This oil can then be used to cool the internal parts of the turbojet 2. The tank 16 may advantageously have a vertically elongated shape. It may have a bean-shaped vertical profile so as to fit against a tubular surface of the turbomachine 2.

An inlet fan, generally called a fan 18, is coupled to the rotor 14 and generates an air flow which is divided into a primary flow 20 and secondary flow 22. The primary flow 20 follows a thermodynamic compression-expansion cycle. The secondary flow 22 provides the majority of the thrust of the turbojet 2 via the fan 18. The fan 18 may be connected to the central shaft via reduction gearing which is lubricated by the oil supply circuit. Its speed can be adjusted. This setting can be adjusted using the mechanical energy of the oil in the oil supply circuit.

Figure 2:
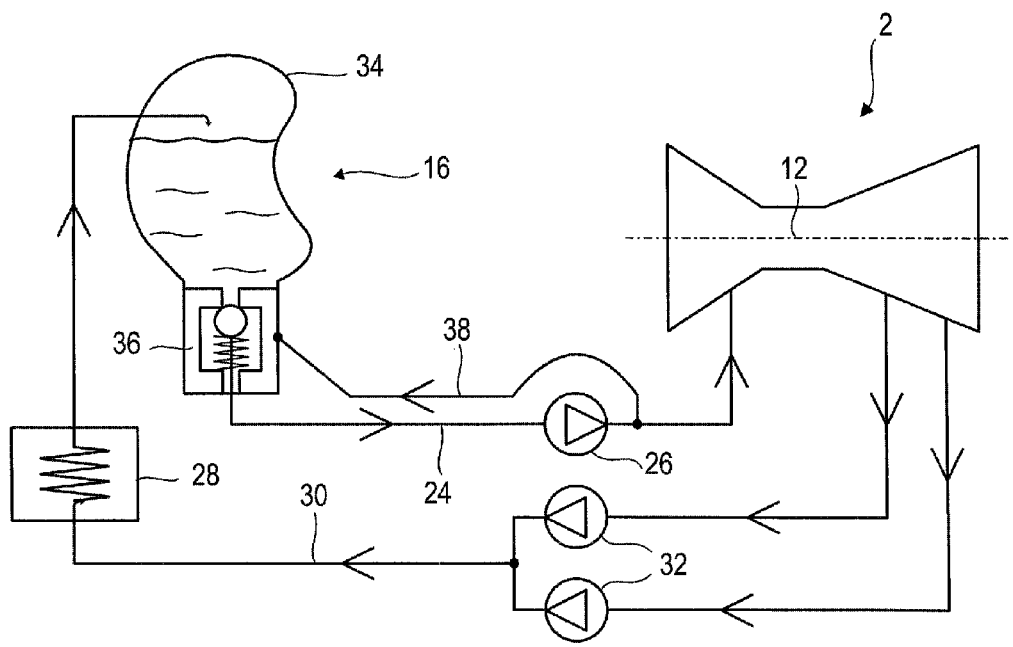
FIG. 2 is a diagram of the supply circuit of the turbomachine of FIG. 1, in accordance with the present application.

FIG. 2 shows the oil supply circuit of the turbomachine in FIG. 1.

The supply circuit comprises a feed branch 24 fed from the tank 16. The feed branch 24 is connected to the turbomachine 2. It is equipped with a feed pump 26 which sucks oil from the tank 16 and injects it into the internal parts of the engine 2. These parts may comprise a bearing lubrication housing and a heat exchanger 28. The heat exchanger 28 may contain a volume of oil greater than 5 liters, preferably greater than 10 liters. The heat exchanger 28 may be a tank within the sense of the present application.

The supply circuit comprises an oil recovery branch 30. This may include recovery pumps 32 to suck oil from the internal parts and discharge it into the tank 16. The oil can be collected in a common housing that surrounds the various internal parts of the engine. The supply circuit may include several supply branches and/or several recovery branches that form parallel loops, and which are connected independently to the tank 16.

The tank 16 has an internal volume of between 20 liters and 200 liters, preferably between 30 liters and 100 liters, more preferably between 40 liters and 70 liters. The volume of oil contained in the tank can vary during the operation of the turbomachine 2. It may be degassed. The volume of oil can be greater than 50% of the internal volume of the tank, preferably greater than 75%. The mass of oil is thus important. In the case of a supply circuit of an aircraft turbomachine, the mass of the oil heavily stresses the tank. Vibration, acceleration and changes of direction of the aircraft stress the shell 34 of the tank because of the oil's inertia.

The tank 16 is located above the feed pump 26 so that the pump is under positive pressure to reduce cavitation. The tank 16 is located at least 50 cm. above the feed pump 26. The tank has an anti-siphon valve 36 designed to prevent it from emptying when the turbomachine is stopped. The valve may be one-way, allowing flow in one direction only. The same anti-siphon valve 36 may also be designed to open when the suction pressure exceeds a given threshold. The suction pressure is the pressure difference between the inlet of the valve on the tank side and the outlet pressure of the anti-siphon valve 36.

The suction pressure is generated by the feed pump 26. The anti-siphon valve 36 is advantageously located at the lowest point of the tank. For the opening of the anti-siphon valve to occur reliably, it is also connected to the discharge side of the feed pump 26. The anti-siphon valve is thus controlled by the output pressure of the pump to open rapidly and completely. For this purpose, the supply circuit comprises an actuator pipe 38.

Figure 3:
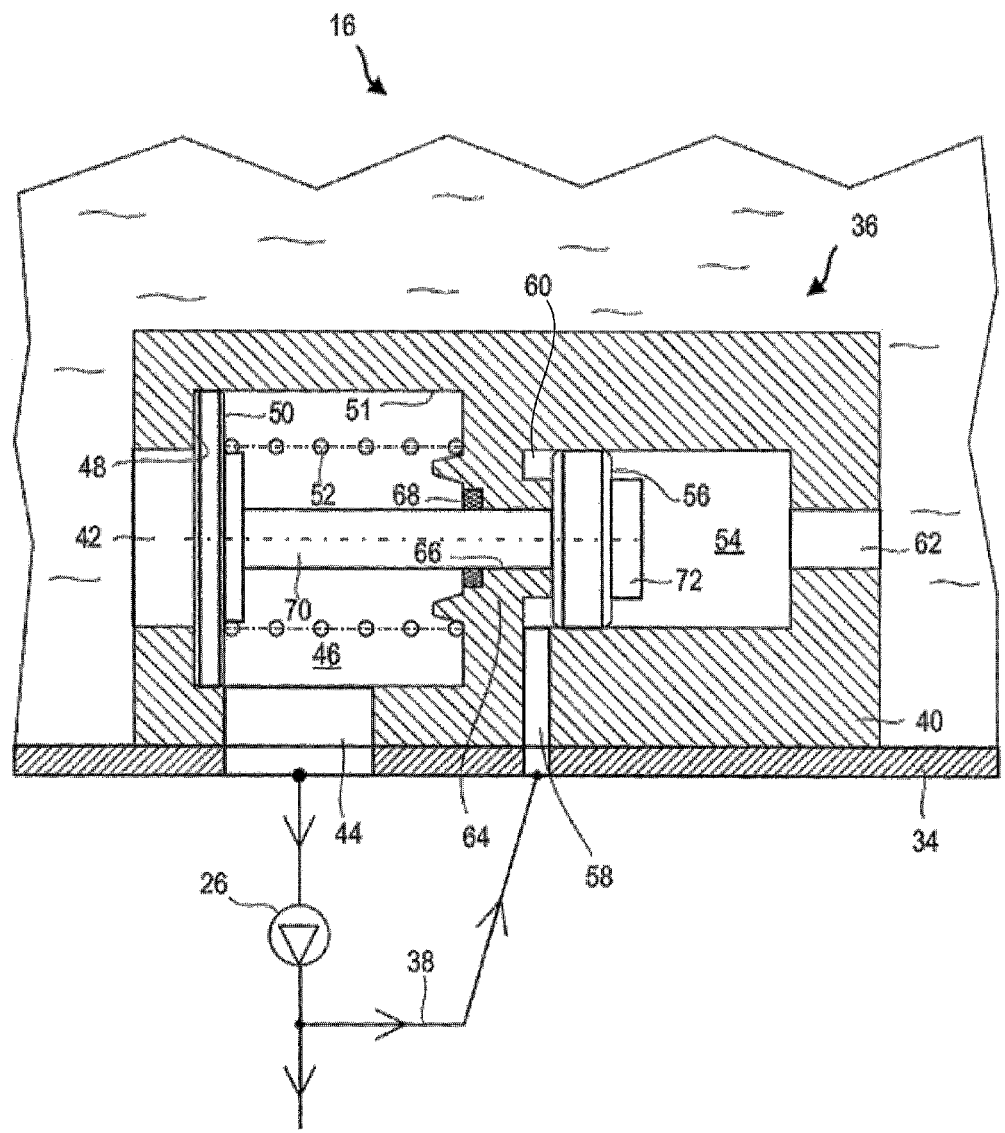
FIG. 3 illustrates part of the oil tank of FIG. 2, fitted with an anti-siphon valve in a closed state, the valve being in accordance with the present application.

FIG. 3 shows part of the supply circuit with part of the tank 16 centred above the anti-siphon valve 36.

The anti-siphon valve 36 comprises a body 40. The valve comprises an inlet 42 and an outlet 44 communicating through the body 40. The anti-siphon valve 36 comprises a passage 46 defined by the body 40. The passage communicates with the inlet 42 and the outlet 44 of the valve 36. The passage 46 may have a cross section varying along its profiling axis. It may vary over only a part of its length. The passage 46 is preferably cylindrical, though it can have any type of cross section, such as square or rectangular. The inlet 42 to the passage 46 is axial, and the outlet 44 is to the side.

The anti-siphon valve 36 comprises a seat 48. The seat 48 is located within the passage 46, preferably at an axial end. The seat 48 has an annular surface, preferably flat. The seat 48 surrounds the inlet 42 of the valve 36.

The anti-siphon valve 36 includes a cut-off device 50 capable of opening and closing the valve. The cut-off device 50 is designed to mate with the seat 48 so as to open and close the anti-siphon valve. The cut-off device is normally in the closed position, that is to say when the pressure at the inlet 42 and the pressure at the outlet 44 are equal. The cut-off device 50 is generally disc-shaped with one face up against the seat 48. At least a part of the inner surface 51 of the passage 46 is generated by the periphery of the cut-off device 50 in its movement between its open and closed position. In this way the suction pressure causes the gradual opening of the cut-off device 50.

The area of the passage defined by the seat 48 is smaller than the area of the cut-off device that is in contact with the seat 48 in the closed position, preferably less than 80% more preferably less than 50%. This aspect further promotes easier opening through an increased surface of the cut-off device which is subjected to the pressure difference between the inlet and the outlet.

The cut-off device is movable between at least a closed position and an open position. The cut-off device 50 slides in the passage along a sliding axis. The sliding axis is optionally parallel to the profiling axis of the passage 46. The movement is preferably a translation. The movement may also be a pivoting movement, possibly around an axis parallel to the seat 48. For example, the means of closure may comprise a pivoting flap. During the opening movement the cut-off device 50 passes over the majority of the axial length of the passage 46. It passes over the majority of the outlet 44 of the valve 36, preferably the entire outlet 44. According to an advantageous embodiment, in the open position the cut-off device 50 does not obscure the outlet 44 so as to leave the passage 46 completely free.

The anti-siphon valve 36 includes elastic means designed to hold it closed. The elastic means acts on the cut-off device. The elastic means may be preloaded so as to ensure there is a minimum pressure before the cut-off device 50 can move. The inlet 42 and the outlet 44 of the valve 36 may be axially separated from each other so as to provide necessary mechanical work for the elastic means before it can start to open. The elastic means may include a spring 52, for example a metal coil spring.

The anti-siphon valve 36 comprises an auxiliary control mechanism. The auxiliary control mechanism is driven by a fluid, preferably by the oil discharged by the supply pump 26 via the actuator pipe 38. The auxiliary control mechanism operates at least between an open state and a closed state. It can be moved between at least the open state and the closed state. The opening movement can be a translation and/or a rotation. The auxiliary control mechanism is designed to drive the cut-off device 50 from at least the closed position to the open position.

The auxiliary control mechanism comprises a chamber 54. The chamber 54 is formed in the body 40 of the valve 36. The chamber 54 has a shaped cross section along the profiling axis of the passage. Preferably, the chamber 54 is cylindrical.

The auxiliary control mechanism also comprises a piston 56 housed in the chamber 54. The piston 56 is movable in the chamber 54. The piston 56 fits the inner surface of the chamber 54. Contact between the inner surface chamber 54 and the outer surface of the piston 56 essentially forms a seal.

The body 40 of the anti-siphon valve 36 includes an actuator pipe 58 in communication with the actuator pipe 38 and the actuating chamber 54. It opens into the chamber 54, between the cut-off device and the auxiliary control mechanism when the latter is in the closed state. To increase the surface over which the delivery pressure of the feed pump 26 is applied to the auxiliary control mechanism in the closed state, the chamber 54 comprises an annular groove 60 open axially towards the auxiliary control mechanism. The annular groove 60 communicates with the actuator pipe 58 and the auxiliary control mechanism. This annular groove 60 is advantageous when the oil is thick as it increases the area of the piston subjected to the pressure of the oil.

The chamber 54 is open on the side opposite the cut-off device 50. It may open out into the tank 16. The side of the chamber 54 located on the open side may include an outlet 62 opening into the body 40. Optionally, the chamber has a constant section all the way to the exterior of the valve.

The valve 36 includes a wall 64 located between the passage 46 and the chamber 54. The wall 64 encloses the passage on one side and the chamber 54 on the other. The wall 64 is generally planar and includes an aperture 66 located between the passage and the chamber.

The valve 36 comprises a means of connection able to transmit a movement of the auxiliary control mechanism to the cut-off device 50. The means of connecting comprises an end-stop system. The end-stop system comprises a rod 70 with an end-stop 72 at one of its ends. The rod 70 passes through the aperture 66 of the wall 64. The end-stop 72 limits the travel of the piston 56 when operating on the rod 70. The rod 70, the piston 56 and the chamber 54 form an actuating cylinder.

The rod 70 may be fixed to the cut-off device and enables the piston 56 to slide along the rod 70. Conversely, the rod 70 may be fixed to the piston and allow the cut-off device to slide along the rod. Alternatively, the rod may be movable relative to the cut-off device and enable both the cut-off device and the piston to slide along it. In this case the rod has an end-stop at both ends.

The advantage of fixing the rod to the cut-off device is that it prevents the latter from tilting in the passage. The rod provides stability since it is a tight fit in the aperture in the wall. This ensures it does not jam.

Optionally, the means of connection may comprise a flexible link, such as a cable, capable of transmitting a tensile force between the piston and the cut-off device.

Figure 4:
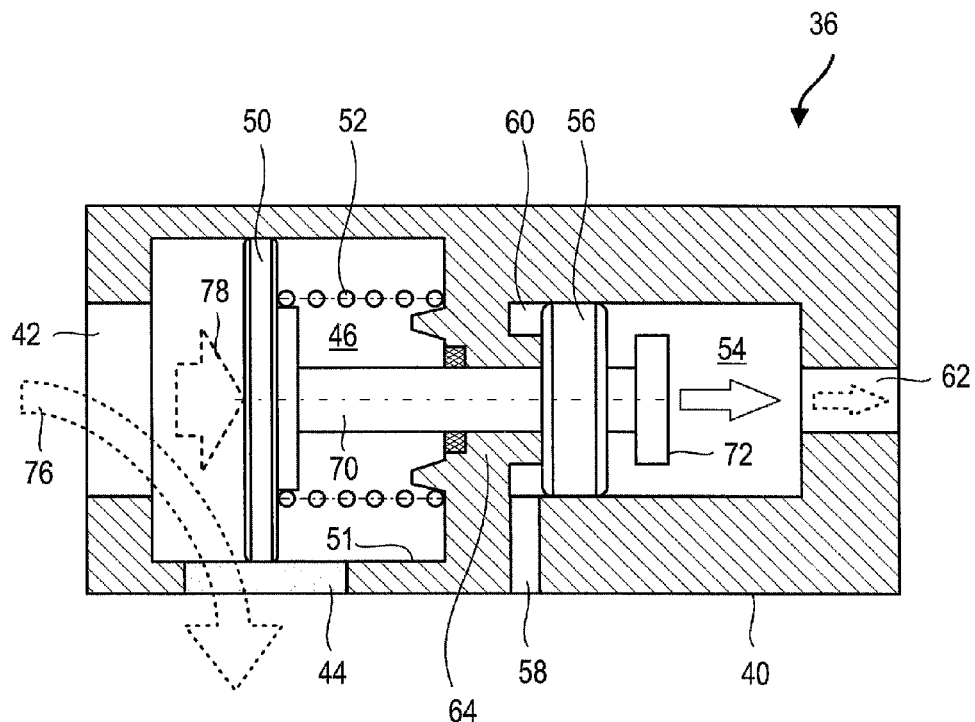
FIG. 4 illustrates an intermediate state of the opening of the anti-siphon valve of FIG. 3.

FIG. 4 shows the valve 36 in a partially open state. This state corresponds to a state where the piston is held in place by the solidified oil in the chamber 54 and/or the actuator pipe 58.

In this state, the suction pressure causes initial opening of the valve 36 and allows the oil to flow 76. Then the dynamic pressure 78 of the flow 76 of oil continues to open the valve 36. The cut-off device 50 is at a distance from the seat 48 but remains axially over the outlet 44. It begins to allow communication between inlet 42 and the outlet 44. The rod 70 moves and the end-stop 72 slides away from the piston 56.

It is noticeable that in this state, the piston is still in the closed state because of the bond caused by the oil. But as the rod can move freely relative to the piston, the opening movement of the cut-off device is not blocked as in the prior art.

Figure 5:
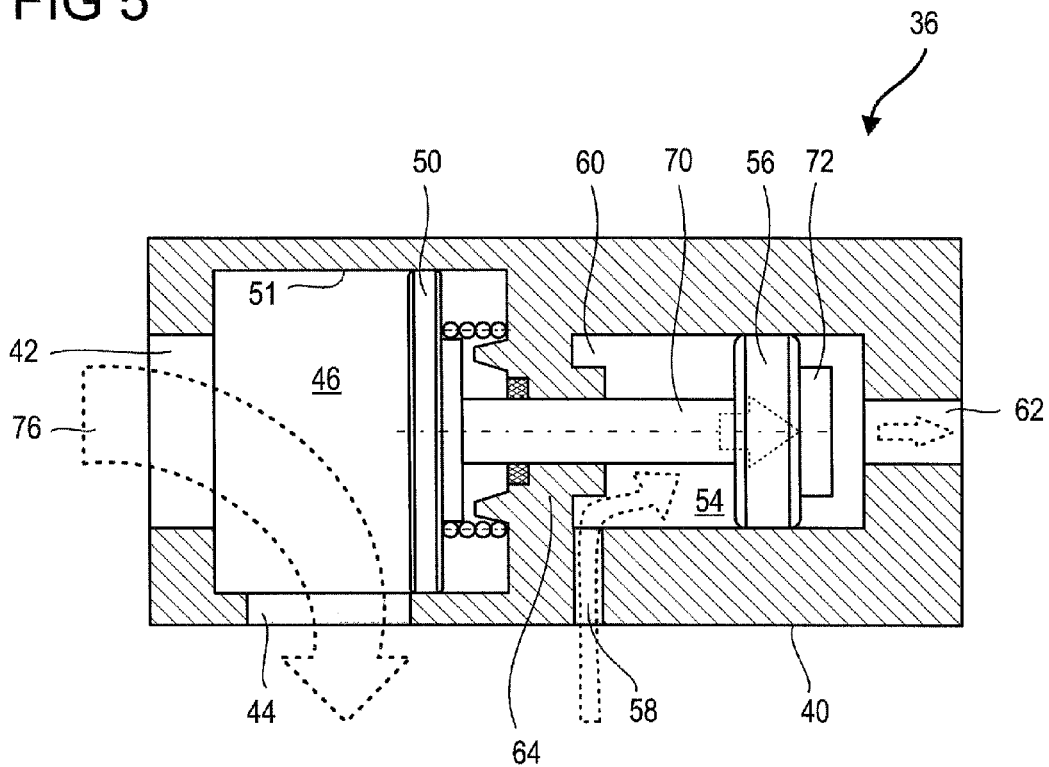
FIG. 5 shows the anti-siphon valve of FIGS. 3 and 4 in an open state.

FIG. 5 shows the valve 36 in an open state; the flow 76 of oil is unobstructed.

In this state, the oil in the supply circuit regains a certain fluidity. The oil can flow through the actuator pipe 58 so as to spread into the chamber 54. It allows the actuation of the auxiliary control mechanism. The piston 56 slides along the rod 70. It moves until it reaches the end-stop 72. At that point it engages the rod 70 via the end-stop 72, and thus the cut-off device.

When the piston 56 arrives at the end-stop, the cut-off device essentially opens the output. Advantageously the cut-off device moves axially away from the outlet 44. Oil contained in the chamber 54 on the opposite side of the cut-off device 50 escapes via the outlet 62 and is forced into the tank.

We claim:

1. An anti-siphon valve for a tank of fluid, comprising:
   a body having an inlet, an outlet, and a passage for the fluid, the passage connecting the inlet to the outlet;
   a moveable cut-off device mating with a seat to close the passage, the cut-off device being normally in a closed position and designed to open the passage in the presence of a pressure difference between the inlet and the outlet that is greater than a positive threshold value; and
   an auxiliary control mechanism physically engaging with the cut-off device, the auxiliary control mechanism being disposed toward the open position of the passage;
   wherein the auxiliary control mechanism of the cut-off device is configured to act on the cut-off device only in the opening direction of the passage, so as to enable the cut-off device to open under the effect of the pressure difference independently of the auxiliary control mechanism.

2. The anti-siphon valve according to claim 1, wherein the auxiliary control mechanism is actuated by a fluid.

3. The anti-siphon valve according to claim 1, wherein the fluid is a liquid.

4. The anti-siphon valve according to claim 1, wherein the auxiliary control mechanism comprises:
   a control piston mechanically connected to the cut-off device by an end-stop system when the piston moves in the direction corresponding to the opening of the passage.

5. The anti-siphon valve according to claim 4, wherein the end-stop system comprises:
   a rod sliding through the piston and having an end-stop with which the piston comes into contact as the piston moves in the direction corresponding to the opening of the passage, the rod being integral with the cut-off device.

6. The anti-siphon valve according to claim 4, further comprising:
   a chamber;
   wherein the control piston forms a sliding fit with the chamber.

7. The anti-siphon valve according to claim 1, wherein the passage includes an inner surface which matches the periphery of the cut-off device during movement between the closed and open positions, the periphery of the cut-off device sweeping across the outlet during movement between the closed and the open positions.

8. The anti-siphon valve according to claim 1, wherein the anti-siphon valve comprises:
   a spring configured to maintain the cut-off device in the closed position, the spring being located between the cut-off device and the auxiliary control mechanism.

9. The anti-siphon valve according to claim 8, wherein the spring is preloaded, so that the limit value of the pressure difference that enables the passage to open is greater than 0.05 bar.

10. The anti-siphon valve according to claim 8, wherein the spring is preloaded, so that the limit value of the pressure difference that enables the passage to open is greater than 0.10 bar.

11. The anti-siphon valve according to claim 8, wherein the spring is preloaded, so that the limit value of the pressure difference that enables the passage to open is greater than 0.50 bar.

12. The anti-siphon valve according to claim 1, wherein the anti-siphon valve comprises:
    an annular groove open axially towards the auxiliary control mechanism, the auxiliary control mechanism being arranged to close the annular groove.

13. A tank for fluid, comprising:
    at least one opening; and
    an anti-siphon valve for closing at least one of the openings;
    wherein the anti-siphon valve comprises:
       a body having an inlet, an outlet, and a passage for the fluid, the passage connecting the inlet to the outlet;
       a moveable cut-off device mating with a seat to close the passage, the cut-off device being normally in a closed position and designed to open the passage in the presence of a pressure difference between the inlet and the outlet that is greater than a positive threshold value;
       an auxiliary control mechanism operably associated with the cut-off device, the auxiliary control mechanism being disposed toward an open position of the passage; and
       an end-stop mechanism mechanically connected to the auxiliary control mechanism and to the cut-off device in such a way that the auxiliary control mechanism of the cut-off device is configured to act on the cut-off device, through the end-stop mechanism, only in the opening direction of the passage, so as to enable the cut-off device to open under the effect of the pressure difference independently of the auxiliary control mechanism.

14. The tank according to claim 13, wherein the anti-siphon valve comprises:
    a chamber opening into the tank; and
    wherein the auxiliary control mechanism comprises a control piston that forms a sliding fit with the chamber.

15. The tank according to claim 13, wherein the anti-siphon valve comprises:
    an actuator pipe communicating with the outside of the tank and the auxiliary control mechanism.

16. The tank according to claim 13, further comprising:
    a heat exchanger configured to exchange heat between air and a liquid.

17. The tank according to claim 13, further comprising:
a casing;
wherein the anti-siphon valve is located inside the casing and the body of the anti-siphon valve is in contact with the casing, or the anti-siphon valve is remote from the casing and the body of the anti-siphon valve is located outside the casing.

18. A turbomachine, comprising:
a tank; and
an anti-siphon valve comprising:
- a body having an inlet, an outlet, and a passage for the fluid, the passage connecting the inlet to the outlet;
- a moveable cut-off device mating with a seat to close the passage, the cut-off device being normally in a closed position and designed to open the passage in the presence of a pressure difference between the inlet and the outlet that is greater than a positive threshold value; and
- an auxiliary control mechanism operably associated with the cut-off device, the auxiliary control mechanism being disposed toward the open position of the passage;
- wherein the auxiliary control mechanism of the cut-off device is configured to act on the cut-off device only in the opening direction of the passage, so as to enable the cut-off device to open under the effect of the pressure difference independently of the auxiliary control mechanism,
- wherein the auxiliary control mechanism comprises a control piston mechanically connected to the cut-off device by an end-stop system when the piston moves in the direction corresponding to the opening of the passage, and
- wherein the end-stop system comprises a rod sliding through the piston and having an end-stop with which the piston comes into contact as the piston moves in the direction corresponding to the opening of the passage.

19. The turbomachine according to claim 18, wherein the anti-siphon valve comprises:
an actuator pipe communicating with the outside of the tank and the auxiliary control mechanism.

20. The turbomachine according to claim 18, wherein the anti-siphon valve comprises:
a heat exchanger configured to exchange heat between air and a liquid.

* * * * *